United States Patent
Jahn

(10) Patent No.: US 6,938,917 B2
(45) Date of Patent: Sep. 6, 2005

(54) DEVICE AND METHOD FOR COVERING AN AIRBAG

(75) Inventor: Thomas Jahn, Forst (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 28 days.

(21) Appl. No.: 10/638,970

(22) Filed: Aug. 11, 2003

(65) Prior Publication Data

US 2004/0145159 A1 Jul. 29, 2004

Related U.S. Application Data

(63) Continuation of application No. PCT/EP02/01337, filed on Feb. 8, 2002.

(30) Foreign Application Priority Data

Feb. 12, 2001 (DE) .......................................... 101 06 661
Dec. 29, 2001 (DE) .......................................... 101 64 054

(51) Int. Cl.⁷ .............................................. B60R 21/20
(52) U.S. Cl. .................................... 280/728.3; 280/732
(58) Field of Search ............................ 280/728.3, 732, 280/731

(56) References Cited

U.S. PATENT DOCUMENTS

| | | | |
|---|---|---|---|
| 4,911,471 A | | 3/1990 | Hirabayashi |
| 5,316,335 A | | 5/1994 | Gray et al. |
| 5,443,285 A | * | 8/1995 | Boll .......................... 280/732 |
| 5,899,488 A | * | 5/1999 | Muller ..................... 280/728.3 |
| 6,364,345 B1 | * | 4/2002 | Lang ........................ 280/728.3 |
| 6,523,854 B1 | * | 2/2003 | Muller ..................... 280/728.3 |
| 6,616,182 B2 | * | 9/2003 | Woolley et al. ............. 280/732 |
| 6,685,216 B2 | * | 2/2004 | Muller ..................... 280/728.3 |

FOREIGN PATENT DOCUMENTS

| | | |
|---|---|---|
| DE | 38 43 686 A1 | 6/1990 |
| DE | 40 22 881 A1 | 2/1991 |
| DE | 42 33 749 A1 | 4/1994 |
| DE | 44 42 543 A1 | 1/1996 |
| DE | 196 46 548 A1 | 5/1998 |
| DE | 297 21 682 U1 | 5/1998 |
| DE | 197 57 435 A1 | 7/1998 |
| DE | 197 57 437 A1 | 7/1998 |
| DE | 298 20 348 U1 | 4/1999 |
| DE | 199 34 600 A1 | 1/2000 |
| DE | 100 01 040 C1 | 2/2001 |
| DE | 100 32 636 A1 | 1/2002 |
| EP | 0 867 346 A1 | 3/1998 |
| EP | 0 940 300 A1 | 9/1999 |
| EP | 10 34 988 A2 | 2/2000 |
| EP | 10 59 210 A2 | 6/2000 |
| WO | WO 99/61288 | 12/1999 |

* cited by examiner

*Primary Examiner*—David R. Dunn
(74) *Attorney, Agent, or Firm*—Martin Fleit; Paul D. Bianco; Fleit Kain Gibbons Gutman Bongini & Bianco P.L.

(57) ABSTRACT

A device for covering an airbag for forming an outer contour of interior trim for a vehicle with a mechanism for opening a cover into the passenger space of the vehicle and with a mechanism for moving the opened cover at least partially out of the passenger space of the vehicle, wherein the mechanism for opening including a first axis is arranged on a side of the cover facing a windshield for pivoting the cover.

21 Claims, 8 Drawing Sheets

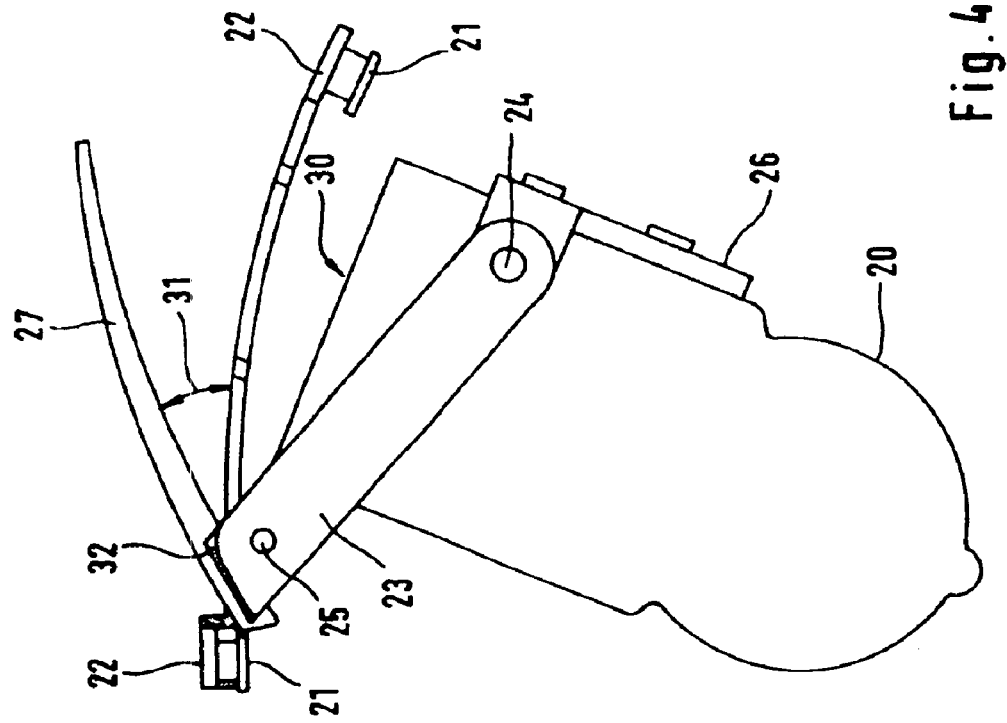
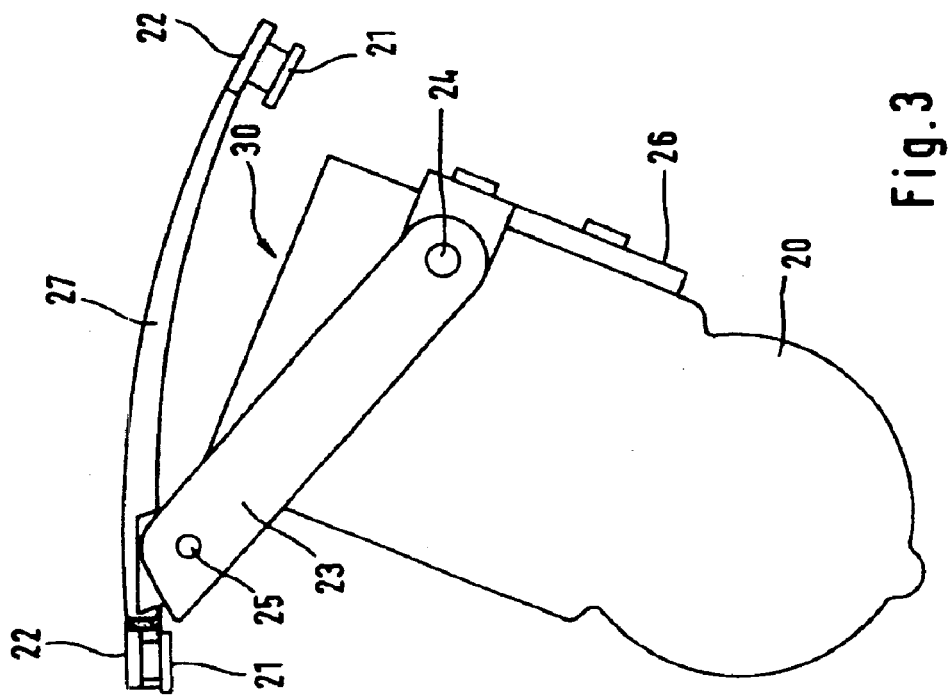

DEVICE AND METHOD FOR COVERING AN AIRBAG

RELATED APPLICATION

This application is a continuation of International Application No. PCT/EP02/01337 filed Feb. 8, 2002, the contents of which are here incorporated herein in their entirety.

BACKGROUND OF THE INVENTION

1. Field of the Invention

The invention relates to a device and method for covering an airbag. More particularly, the invention relates, as well, to a corresponding instrument panel, an airbag module, and a method for producing an instrument panel module.

2. Prior Art

It is generally typical for airbag covers to be coupled to the instrument panel by means of a hinge, which is arranged between the instrument panel and an edge region of the airbag cover. Here, the edge region of the airbag cover is connected to the instrument panel by an intended rupture point. If the airbag abruptly unfolds during an impact, then the intended rupture point is broken, so that the airbag cover performs a pivoting movement into the vehicle interior, into which the airbag unfolds.

U.S. Pat. No. 5,316,335 discloses an airbag cover, wherein the airbag is separated from the instrument panel by cutting blades in the even of an impact. DE 196 46 543 discloses another airbag cover, for which the connection to the instrument panel is separated by cutting, DE 38 43 686 A1 discloses a cover for an airbag arrangement in a motor vehicle. Here, an airbag unit fixed within a dashboard is covered from the passenger compartment by a lid. The lid is locked to the dashboard, so that the airbag filled with gas by the airbag unit releases the lid from the dashboard and is displaced upwards in the direction of the windshield. Here, the lid remains connected to the dashboard by means of a holding strip. When the holding strip is stretched due to an unfolded airbag, the points at which the holding strip is fastened to the lid and to the dashboard are used as hinge pins, about which the lid pivots. A refinement of this cover is disclosed in EP 0 940 300 A1. A disadvantage for this construction is the impact of the lid on the windshield, which leads to the risk of damage or destruction of the windshield, particularly for compact cars.

DE 196 46 548 discloses an interior trim part for motor vehicles fitted with an airbag. When the airbag is triggered, the cover region of the guidance channel is torn open along its center line. The torn region opens in the form of a pointed oval, similar to the shape of the open mouth of a fish.

The publications DE 100 01 040 C1, DE 40 22 881 C2, and EP 0 940 300 A1 disclose various other airbag covers, which are swung into the passenger compartment when triggered, with the motion of the cover being limited by a restraining belt. Here, a common disadvantage is the risk of injury due to the entry of the cover into the passenger compartment.

EP 0 867 346 A1 discloses an airbag device wherein a cover device opens an outlet opening for the airbag by moving within the outer contours of the airbag device or the vehicle part containing the airbag device. This should reduce the risk of injury of a vehicle occupant due to the airbag device. A disadvantage for this known device is that at least one part of the generator gas flow required for inflating the airbag is required for activating the cover device. Furthermore, when the cover device is activated, it initially leads to peeling of the carrier part located on the inside from the external decorative film due to shear forces, i.e., the decorative film is not opened, but instead continues to cover the outlet opening of the airbag. The decorative film is first broken by the airbag, which shoots out of the outlet opening. This method has the risk of sending decorative film particles, which represent a risk of injury, into the passenger compartment.

From DE 197 57 437 A1 discloses an airbag with a self-opening process of the cover flap wherein the opening of the cover flap proceeds within an outer boundary of the dashboard. Here, one disadvantage is the high expense of construction. Here is also known to pivot the airbag housing for opening an outlet opening, so that the cover flap projects into the passenger space of the vehicle. A disadvantage is the increased risk of injury due to the airbag flap projecting into the passenger space of the vehicle.

U.S. Pat. No. 4,911,471, DE 42 33 749 C2, DE 199 34 600 A1, and DE 44 42 543 A1, discloses airbag covers, wherein an airbag flap is opened into the passenger space of the vehicle after the triggering of the airbag. A common disadvantage of this device, in turn, is a risk of injury from the opened airbag flap projecting from the instrument panel, particularly if the passenger is "out off [sic] position."

SUMMARY OF THE INVENTION

The invention is based on the problem of creating an improved device and an improved method for covering an airbag.

This problem is solved by the features of the independent claims. Preferred embodiments are given in the dependent claims.

The invention enables improved protection of the occupants of a vehicle, particularly the passenger, and links this with the possibility of a cost-effective realization that is not expensive in terms of construction.

One special advantage of the invention is that the cover at first does indeed open into the passenger space of the vehicle if there is an impact, but then is moved out of the passenger space of the vehicle, at least partially, e.g., into a region underneath the instrument panel. This prevents parts of the cover from being located in an area of possible head impact after the opening of the airbag. This leads to improved protection even when, e.g., the passenger is not buckled in or is located "out of position" (OOP).

Another special advantage of the invention is that the shot channel of the airbag can point directly towards the cover, without requiring a deflector, a baffle plate, or the like. Due to these reasons, only a relatively low expansion force of the airbag is necessary in order to open the cover, so that a relatively small gas generator can be used. An airbag with a relatively low gas pressure means an especially high degree of safety for the vehicle occupants because the risk of injury due to the unfolding of the airbag can be reduced due to the relatively low unfolding pressure.

Here, it is especially advantageous that the opening of the airbag flap into the passenger space of the vehicle directly-after the triggering of the airbag is limited by a defined angle. The corresponding opening motion by the defined angle is preferably a pivoting motion about an axis at one end of a carrier of the airbag flap.

It is further especially advantageous that the opening motion of the airbag flap proceeds according to a precisely set motion pattern. This is preferably selected so that the pivoting motion into the passenger space of the vehicle, as well as the subsequent pivoting motion in the direction underneath the instrument panel, is performed in a direction facing away from the area of possible head impact.

According to a preferred embodiment of the invention, the defined opening angle of the airbag flap into the passenger space of the vehicle is set by a stop formed during the opening of the airbag flap at one end region of the carrier. This is a particularly favorable solution in terms of construction, since, on the one hand, it can be realized cost-effectively, and it guarantees the greatest possible degree of safety, on the other.

According to another preferred embodiment of the invention, the airbag flap is positioned in the outlet opening of the instrument panel so that it essentially forms a continuous plane, i.e., the border of the airbag flap or the border of the frame of the airbag module ends flush with the border of the instrument panel in the outlet opening.

Preferably, cutting blades are arranged on the surface of the airbag flap. This allows a homogeneous decorative layer to be applied on the plane formed by the instrument panel and the airbag flap, without requiring expensive, previous attenuation of the decorative layer in the region of the outlet opening.

This preferred embodiment of the invention takes advantage of the condition that the airbag flap is essentially pulled out of the passenger space of the vehicle. Due to this condition, the attachment of cutting blades to the airbag flap for separating the decorative layer is not a matter of concern since the cutting blade, together with the airbag flap, is immediately pulled under the instrument panel back from the passenger space of the vehicle after the opening of the airbag flap by the defined angle into the passenger space of the vehicle, i.e., after the severing of the decorative layer.

Therefore, any risk of injury by the cutting blade is prevented even for persons "out of position" and, simultaneously, significant cost savings are realized through savings of the otherwise required attenuation step for producing an intended rupture point in the opening region of the decorative layer. This is particularly advantageous because it can eliminate otherwise necessary laser attenuation of the decorative layer or the like.

Another special advantage of the invention is that, in addition to the typical decorative film on a foam layer, materials can also be selected as the decorative layer, which are tough and for which the state of the art does not give any method for realizing intended rupture points. This is the case, particularly for leather, i.e., natural or synthetic leather. Thus, an instrument panel with an airbag can also be equipped with a decorative layer made from leather based on the present invention. Furthermore, based on the invention, frequently the otherwise typically expensive sewing of leather parts with special sewing technology can be eliminated.

According to another preferred embodiment of the invention, the gas generator is not arranged in the airbag module, but instead the gas generator is arranged in a suitable location in the vehicle and connected to the airbag module by means of a gas line. This has the particular advantage that the heavy gas generator need not be attached to the cross member of the vehicle, as otherwise typical, so that, e.g., the cross member can be built lighter and is further optimized in terms of oscillations. Alternatively, the gas generator can also be arranged, e.g., on the dashboard of the vehicle, particularly for the case of a self-supporting instrument panel.

The airbag module can be assembled completely by the manufacturer and can then be inserted without special expense and above all, without special safety expense, into the instrument panel during the course of its production because the gas generator is not included.

Another advantage of the invention is that impact of the cover on the windshield is prevented, so that the opening of the airbag does not lead to damage to the windshield.

Another advantage of the invention is that even for so-called secondary impact, injury to the passenger due to projecting parts of the cover can be prevented. For this purpose, the cover can be arranged close to the seam of the windshield. The arrangement close to the seam of the windshield is typically outside of the area of possible head impact, so that on the one hand, expensive designs for satisfying legal requirements for head impacts can be eliminated and, on the other hand, an active support of the separating process of the cover by means of moving blades, spikes, or the like is enabled, without this leading to a risk of injury. Previously, cutting means for opening the airbag cover were typically not used. This non-use of cutting means increases the risk that a greater or smaller number of particles, which can be thrown into the passenger compartment in an undesired way, are produced by the bursting open of the decorative layer. This is prevented to the greatest possible extent by the use of cutting means according to the invention.

According to a preferred embodiment, when the airbag opens, the cover initially performs a pivoting motion about a first axis in order to describe, after reaching a maximum opening angle into the passenger space of the vehicle, a second pivoting motion about a second axis with a direction of motion away from the passenger space of the vehicle. Here, preferably the two pivoting motions proceed in a direction facing essentially away from the area of possible head impact.

Here, a special advantage is that during the pivoting motion about the first axis, one or more intended rupture points between the cover and the instrument panel are reliably severed, so that the decorative layer does not peel off in the area of the intended rupture point, but instead initially remains fixed to the cover. This minimizes the risk of decorative-film particles entering into the passenger space of the vehicle. Advantageously, for a rectangular cover, the intended rupture points are arranged on three sides; on the fourth side of the cover facing the windshield, no intended rupture point is necessary. Due to the pivoting motions, a controlled peeling of the decorative film from the cover can be achieved there, with the peeled decorative film remaining connected to the instrument panel in a region opposite the fourth side.

According to a preferred embodiment, when the airbag opens, the cover initially performs a pivoting motion about a first axis in order to describe, after reaching a maximum opening angle into the passenger space of the vehicle, a second pivoting motion about a second axis with a direction of motion away from the passenger space of the vehicle. Here, preferably the two pivoting motions proceed in a direction facing essentially away from the area of possible head impact.

The opening of the cover into the passenger space of the vehicle can be limited by a tension element, e.g., a band or cord, or by a stop. As soon as the maximum opening angle is reached, the pivoting motion about the second axis is triggered.

Alternatively, the pivoting motion about the second axis is initially blocked by a mechanical element, particularly during the pivoting motion about the first axis. After completion of the pivoting motion about the first axis, the pivoting motion about the second axis is then released; this can be performed mechanically or electromechanically.

However, it is also possible to perform the pivoting motions about the first and the second axes at least partially simultaneously. For supporting the pivoting motion about the second axis, tension or compression springs can be provided. Furthermore, the drive for the pivoting motions can also be supplied by an additional pyrotechnic charge or by the expansion force of the airbag. Here, e.g., part of the expansion force of the airbag can be deflected to the cover, so that the cover performs the desired motion.

The mechanism for moving the cover can also be configured as a parallelogram or multiple articulated elements. It is further possible to configure the cover as two or more parts, with at least one of the parts of the cover initially opening into the passenger space of the vehicle before it moves out of the passenger space of the vehicle.

In the following, the invention will be described in more detail with reference to a preferred embodiment.

BRIEF DESCRIPTION OF THE DRAWINGS

Shown are.

DETAILED DESCRIPTION OF PREFERRED EMBODIMENTS OF THE INVENTION

Figure 1:
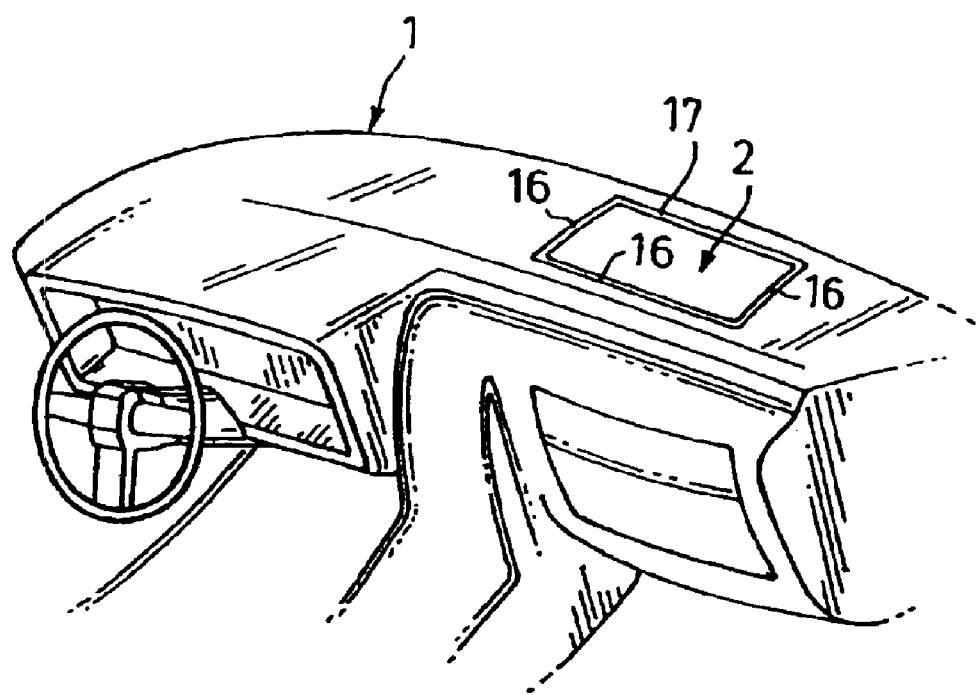
FIG. 1, a perspective illustration of an instrument panel with a cover for an airbag, FIG. 2, a side view of the opening mechanism of the cover in various positions, FIG. 3, a preferred embodiment of an airbag device according to the invention in closed state, FIG. 4, the embodiment of FIG. 3 after opening of the airbag flap by a defined angle, FIG. 5, the embodiment of FIGS. 3 and 4, after which the airbag flap is pivoted out of the passenger space of the vehicle under the instrument panel, FIG. 6, an embodiment of an airbag module according to the invention, FIG. 7, an embodiment of an instrument panel according to the invention with an airbag module, FIG. 8, the airbag module of FIG. 7 after opening of the airbag flap by the defined angle.

FIG. 1 shows an instrument panel 1 with an airbag cover 2. The airbag cover is connected to the instrument panel 1 by means of intended rupture points 16. At the side opposite the edge 17 of the instrument panel 1, the airbag cover 2 is separated from the instrument panel 1. A decorative film, which is applied on a foam layer, stretches over the instrument panel 1 and the airbag cover 2.

Figure 2:
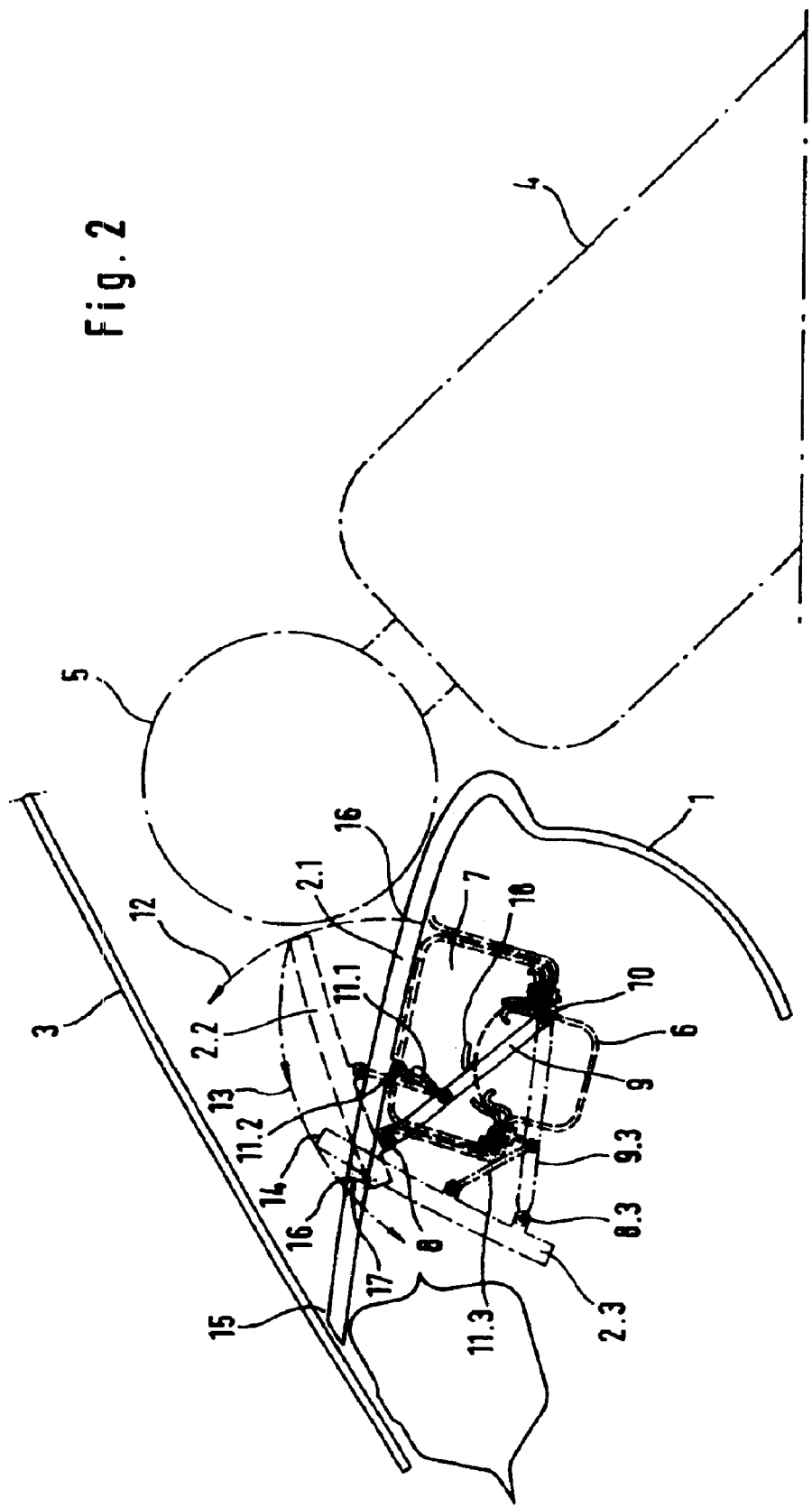

FIG. 2 shows a schematic side section view of the instrument panel 1 in a region of the airbag cover 2. FIG. 2 further shows a windshield 3 and a person 4 with a head 5. The illustrated person 4 in the embodiment considered here concerns a passenger.

An airbag 6 and an opening region 7 for the airbag 6 are located underneath the instrument panel 1.

Under normal operating conditions, the airbag cover 2 forms a closed unit with the instrument panel 1. Here, the connection of the airbag cover 2 to the instrument panel 1 has one or more intended rupture points 16. If there is an impact, the airbag 6 is triggered, so that it unfolds into the opening region 7 and exerts a force on the inner side of the airbag cover 2. This force leads to breaking of the intended rupture points 16.

In the illustrated embodiment, the airbag cover 2 is attached to a carrier 9 with a joint 8 in a region facing away from the person 4. The other end of the carrier 9 is attached to a joint 10. A stop 18 is located above the carrier 9; the stop 18 contacts the carrier 9 under normal operating conditions or has only a small distance from the carrier 9. Furthermore, a band 11 with extra length is attached between the airbag cover 2 and the carrier 9.

As soon as the unfolding airbag strikes the underside of the airbag cover 2 and after the intended rupture points 16 between the airbag cover and the instrument panel 1 are broken, the airbag cover begins to open from its original position indicated by 2.1 into the position indicated by 2.2 in the passenger space of the vehicle. Here, a pivoting motion about the axis formed by the joint 8 is performed. The carrier 9 initially remains stationary since it is held by the stop 18 against the pressure of the unfolding airbag 6. The pivoting motion is to be performed in the pivoting direction 12 towards the windshield 3.

In contrast, the band 11 is moved away from its original position indicated by 11.1 into the position indicated by 11.2. The opening angle between the airbag cover 2 in its position 2.2 and the carrier 9 is defined by the length of the band 11. As soon as the band 11 is completely taut by the pivoting motion about the axis formed by the joint 8, the pivoting motion about the joint 8 is blocked. As an alternative or supplement, a catch or a stop can be present on the joint 8 in order to stop the pivoting motion about the joint 8 when the maximum opening angle is reached.

The position of the airbag cover 2 indicated by 2.2 is already achieved a few milliseconds after an impact due to the relatively short pivoting path, and hence at a time at which the person 4 with his head 5 is still relatively far from the instrument panel 1.

As soon as the maximum opening angle is achieved in position 2.2, a force component acts on the carrier 9, which acts in the direction towards the interior of the instrument panel 1, so that the second pivoting motion is performed in the pivoting direction 13 about the joint 10. At the beginning of the second pivoting motion, the decorative layer 39 starts to peel from the foam layer 40 in the area of the airbag cover 2.

By moving about the axis formed by the joint 10, the airbag cover 2 reaches its final position 2.3. The corresponding positions of the joint 8, the carrier 9, and the band 11 are designated by 8.3, 9.3, and 11.3, respectively.

In its end position 2.3, an end region 14 of the airbag cover 2 still projects over the border of the instrument panel 1 into the passenger space of the vehicle. However, this represents no risk to the person 4, because the end region 14 is located close to the seam 15 of the windshield, and hence far outside the area of possible head impact, even if the person 4 is unbuckled or is located in an OOP position.

Furthermore, in the end position 2.3 the peeled decorative film remains cohesive and attached to the edge 17 of the instrument panel 1, so that there is no risk of injury due to parts or particles of the decorative film released into the passenger space of the vehicle.

Alternatively, the mechanism for moving the airbag cover 2 can also be formed so that in its end position it completely disappears underneath the instrument panel 1.

FIG. 3 shows a side view of an embodiment of an airbag module according to the invention. The airbag module has a housing 20 in which an airbag is located. The housing 20 has fastening means 21 for fastening the airbag module to its frame 22 in a corresponding opening of an instrument panel.

A carrier 23 is hinged at an axis 24 on the housing 20. The airbag flap 27 of the module shown in FIG. 2 is hinged at an axis 25 of the carrier 23.

According to a preferred embodiment, a connection 26 for a gas generator is located on the housing 20. The gas generator can be attached at a suitable point in the vehicle, different than otherwise typical, and connected by means of a gas line to the connection 26. This has the advantage that the relatively heavy gas generator does not have to be attached to the cross member of the vehicle. Thus, the cross member can be built lighter; furthermore, the cross member can be optimized in terms of oscillations.

The airbag module of FIG. 3 is formed as a closed unit, which includes all parts necessary for the realization of an airbag function, with the exception of the gas generator. In particular, a shot channel for the airbag is formed in the housing 20. However, according to an alternative embodiment, a gas generator, as otherwise typical, can also be integrated into the airbag module.

The airbag module of FIG. 3 can be produced as a separate component and can be installed into the instrument panel as a complete system by means of the fastening elements 21.

The frame 22 is not absolutely necessary. For example, the housing 20 can be equipped so that it can be attached directly to the instrument panel by means of corresponding fastening elements on the housing 20.

FIG. 4 shows the airbag module of FIG. 3 after the airbag has been triggered. After its triggering, the airbag escapes from the outlet opening 30 of the housing 20 and makes impact against the underside of the still closed airbag flap 27. Due to the forces resulting from the airbag striking the airbag flap 27, the airbag flap 27 opens at an angle 31. The angle 31 is defined such that the recess located in the airbag flap 27 forms a stop with the outer contour of the carrier 23 in its end region. According to a preferred embodiment, the outer contour of the end region of the carrier 23 locks into the recess of the airbag flap 27 with a positive fit. Alternatively, the stop is formed only as a non-positive fit by the continuously acting expansion force of the airbag.

After the stop has been formed, a resulting force acts in a direction underneath the frame 22 due to the airbag flap 27 opened by the angle 31. Due to this force, the carrier 23 with the airbag flap 27 opened by the angle 31 pivots about the axis 24.

Figure 5:
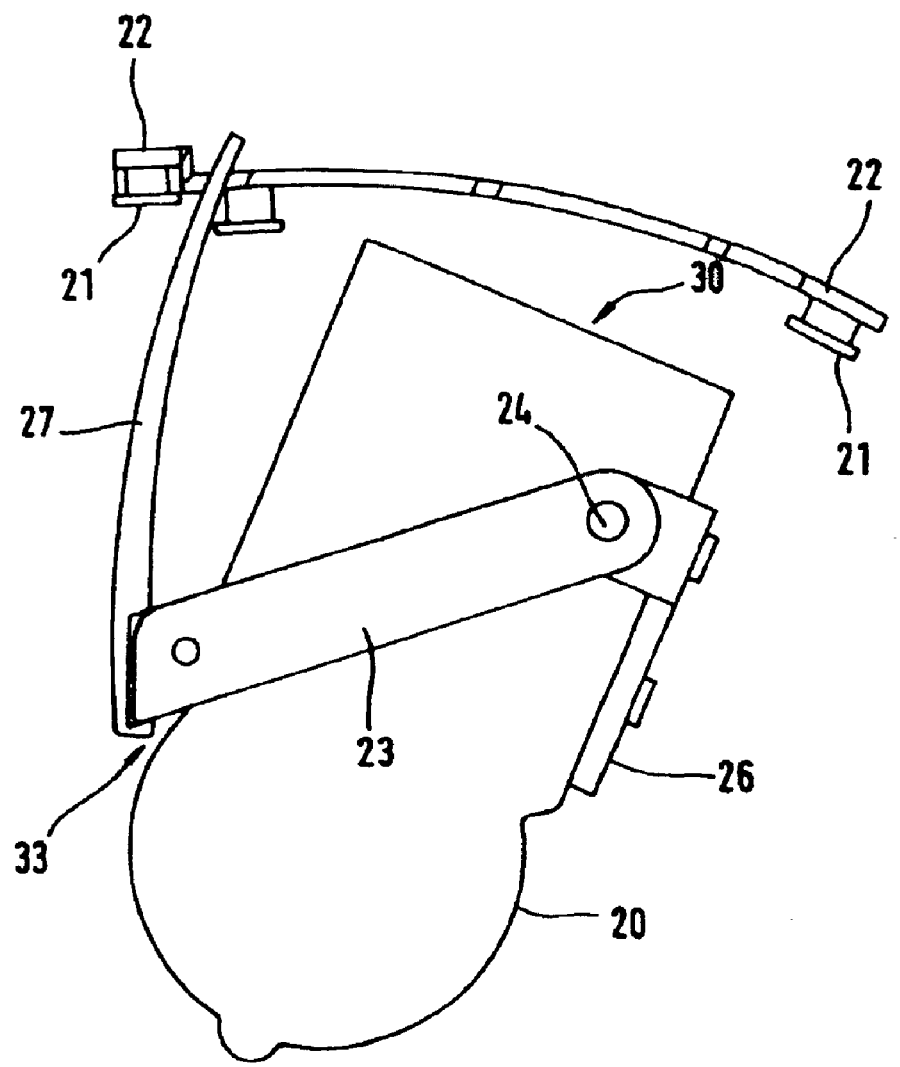

The end position of the pivoting motion about the axis 24 is represented in FIG. 5. The pivoting motion about the axis 24 is limited by a stop 33 at the housing 20 with the airbag flap 27 and/or the carrier 23.

Figure 6:
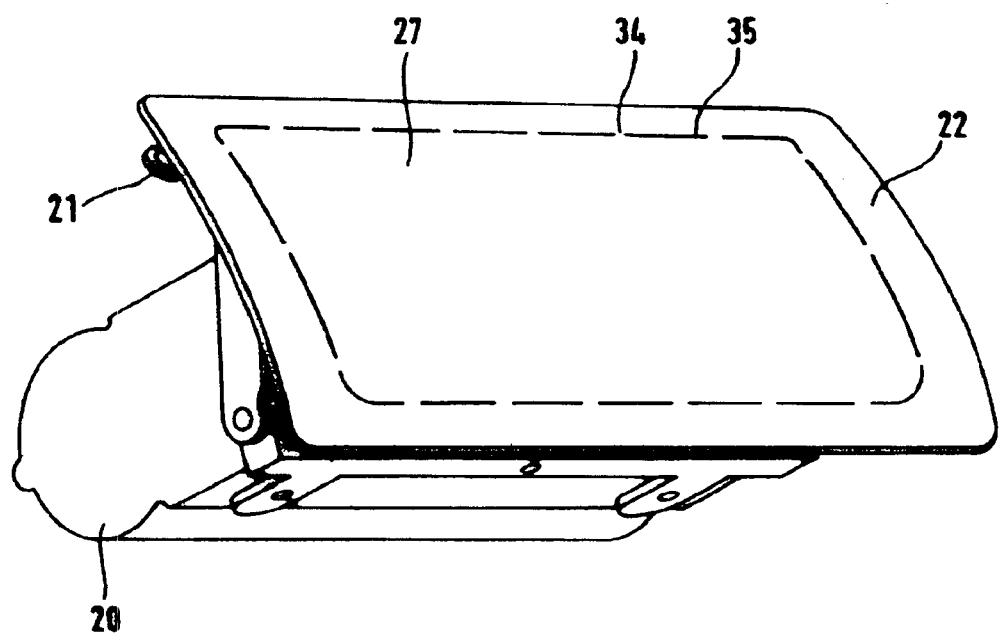

FIG. 6 shows a perspective view of the airbag module of FIGS. 3, 4, and 5 in the closed state. The airbag flap 27 has cutting elements 35 along its border 34. Such cutting elements 35 can be arranged on the airbag flap 27, without this representing a risk in terms of safety. Finally, the airbag flap 27 is pulled under the instrument panel after an initial opening at the angle 31 (cf. FIG. 4) Into the passenger space of the vehicle, so that the cutting elements 35 also represent no risk.

Figure 7:
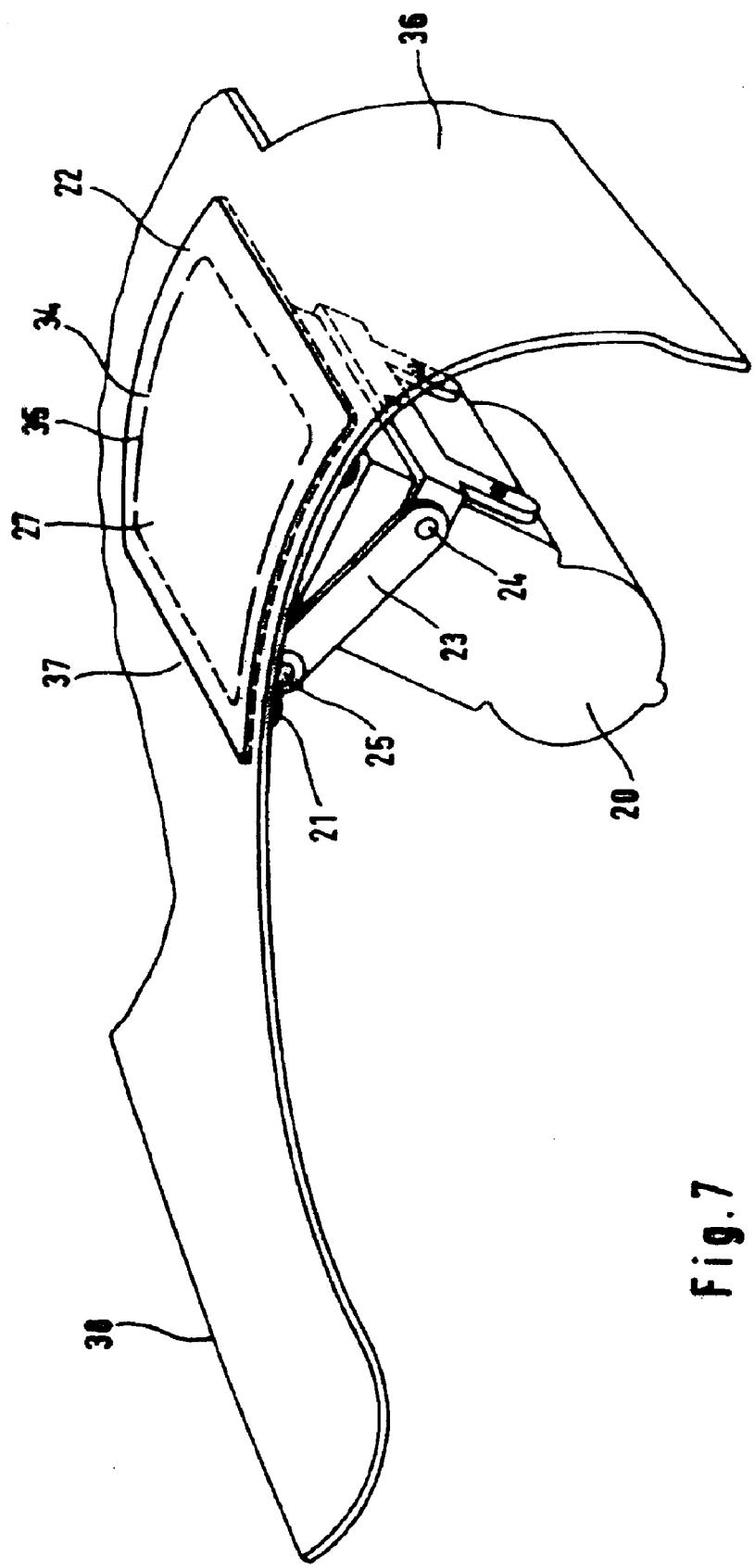

FIG. 7 shows a perspective view of the embodiment of the airbag module of FIGS. 3–6, which is attached to the carrier 36 of an instrument panel by means of the fastening elements 21. Here, the surface of the airbag flap 27 and the frame 22 with the carrier 36 forms a curved plane, i.e., the airbag flap 27 and the frame 22 are arranged flush with a border 37 of the carrier 36. This curved plane is sealed towards the back by the seam 38 of the windshield.

For the arrangement of FIG. 7, it is especially advantageous that the airbag module is produced and can be delivered as a closed system. This module is then fixed by means of the fastening elements 21 on the carrier 36 of the instrument panel.

In a subsequent processing step, a decorative film can then be applied on the plane formed by the carrier 36, the frame 22, and the airbag flap 27. Here, the film can be a typical decorative film made of plastic on a foam layer or else a layer made of leather, particularly natural or synthetic leather.

Attenuation of the decorative layer for realizing an intended rupture point in the region of the outlet opening of the airbag, i.e., along the border 34 of the airbag flap 27, is not required, because the decorative layer is separated by the cutting elements 35 when the airbag flap 27 is opened at the angle 31 (cf. FIG. 4) into the passenger space of the vehicle. Here, a region from the decorative layer is cut out by the cutting elements 35, which essentially corresponds to the contours of the airbag flap 27. The region of the decorative film cut out by the cutting elements 35 remains hanging between the cutting elements 35 and is moved from the passenger space of the vehicle together with the motion of the airbag flap 27 under the carrier 36.

Figure 8:
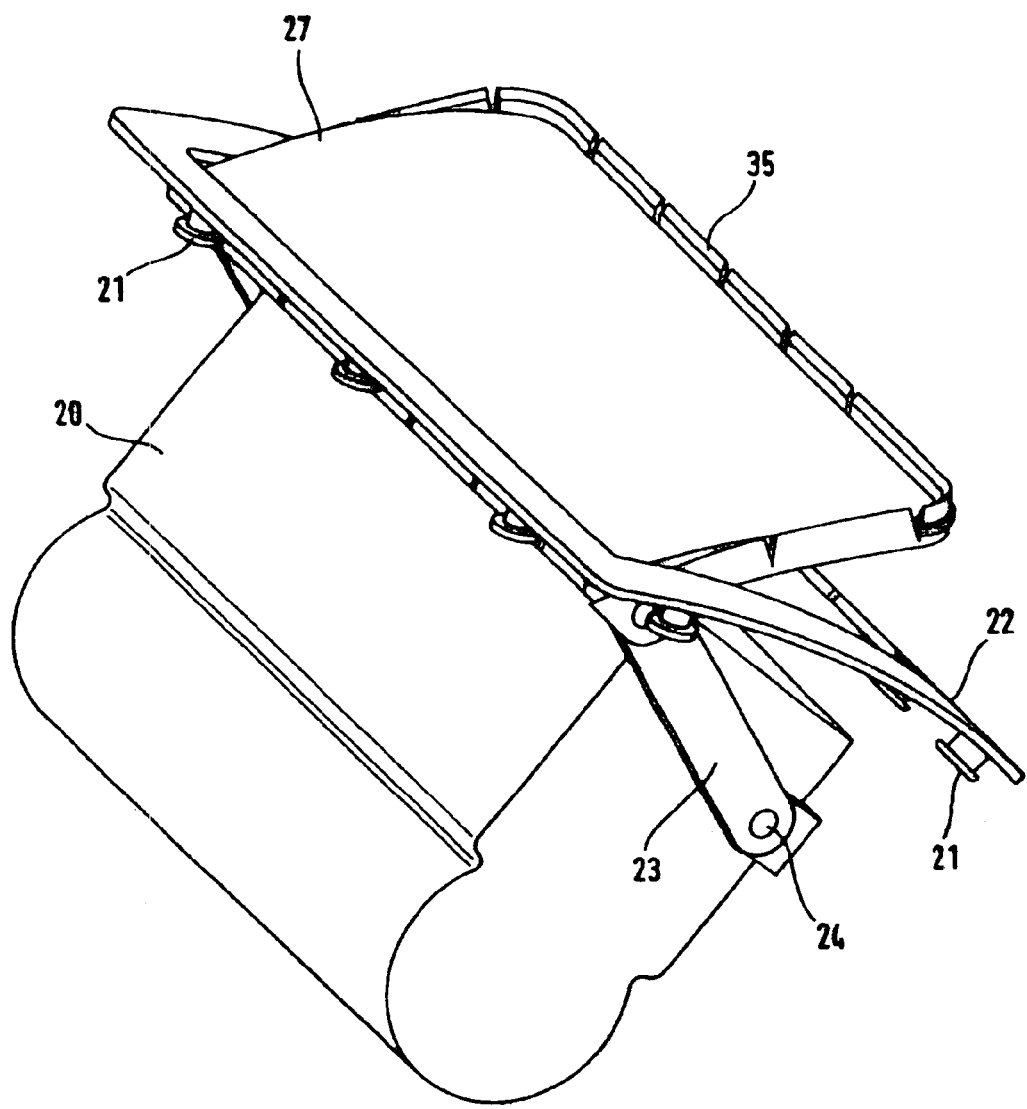
Figure 9:
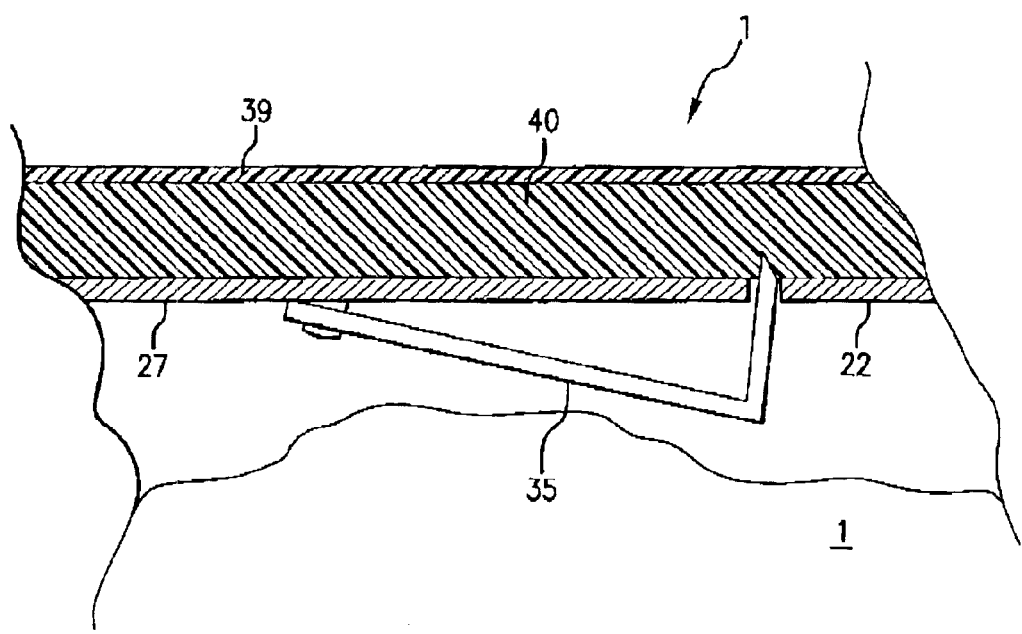
FIG. 9, a fragmentary, sectional view of the instrument panel and airbag cover.

FIG. 8 shows a perspective view of the airbag module of FIGS. 3–7 with an airbag flap 27 opened at the angle 31 (cf. 4).

The embodiment of the invention illustrated with reference to FIGS. 3–8 is especially advantageous relative to the embodiments of FIG. 2 if the restraining band is replaced by a positive-fit stop on the carrier 23. This construction is especially cost-effective in terms of production and is simultaneous safe.

The housing 20 of the airbag module can be a one-piece plastic injection-molded part, which is associated with weight savings in comparison with the state of the art. In addition, by encapsulating the airbag in the housing 20, the risk of damage to the airbag is prevented.

The fastening elements 21 can be realized through adhesion, screws, or seams, or other fastening techniques. With such fastening elements, the frame 22 of the airbag module is connected to the carrier 36 of the instrument panel (cf. FIG. 7), so that the shot channel of the airbag in the housing 20 is directed correspondingly.

Of special advantage for the illustrated embodiment of the invention is further that in the decorative layer, no seams, intended rupture points, or the like are required in the area of the airbag flap 27, which guarantees an attractive appearance.

LIST OF REFERENCE SYMBOLS

1. Instrument panel
2. Airbag cover
3. Windshield
4. Person
5. Head
6. Airbag
7. Opening region
8. Joint
9. Carrier
10. Joint 11. Band
12. Pivoting direction
13. Pivoting direction
14. End region
15. Windshield seam
16. Intended rupture point
17. Edge
18. Stop
20. Housing
21. Fastening element
22. Frame
23. Carrier
24. Axis
25. Axis
26. Connection
27. Airbag flap
30. Outlet opening
31. Angle
32. Recess
33. Stop
34. Border
35. Cutting element
36. Carrier
37. Border
38. Windshield seam
39. Decorative layer
40. Foam layer

What is claimed is:

1. Device for covering an airbag for forming an outer contour of interior trim for a vehicle, with means for opening a cover into the passenger space of the vehicle, with means for moving the opened cover at least partially out of the passenger space of the vehicle, and with a carrier for the cover, wherein the opening means has a means for pivoting the cover about a first axis, wherein the first axis is located at a first end of the carrier and is arranged on a side of the cover facing a seam of a windshield, wherein the cover initially pivots in a first motion about the first axis by a defined angle into the passenger space of the vehicle, the defined angle is given by a stop formed in an end region of the cover that interacts with an end region of the first end of the carrier, and wherein the moving means has means for pivoting the cover in a second motion about a second axis, wherein the second axis is located at a second end of the carrier opposite the first end.

2. Device according to claim 1, for which the opening of the cover into the passenger space of the vehicle is limited by a tension element.

3. Device according to claim 1, for which the opening of the cover into the passenger specs of the vehicle is limited by a stop, which is given by reaching a predetermined opening angle of the cover.

4. Device according to claim 1, for which the cover is formed in two parts, so that at least one part of the cover can open into the passenger space of the vehicle.

5. Device according to claim 1, with means for transferring one part of the expansion force of the airbag for driving the motion of the cover out of the passenger space of the vehicle.

6. Device according to claim 1, with cutting means for separating the cover from an instrument panel.

7. Device according to claim 6, wherein the cutting means is triggered pyrotechnically when there is an impact.

8. Device according to claim 1, with a stop for receiving a part of the force that is exerted by the airbag on the cover during a pivoting motion of the cover about the first axis.

9. Device according to claim 1, with a parallelogram or multiple articulated elements for opening the cover into the passenger space of the vehicle and for moving the opened cover out of the passenger space of the vehicle.

10. Device according to claim 1, with a frame for the cover, wherein the frame together with one of the cover and a carrier of an instrument panel essentially form a single plane.

11. Device according to claim 10, with a decorative layer applied over the cover, the frame, and the carrier of the instrument panel.

12. Device according to claim 11, for which the decorative layer has essentially a constant thickness, in the region of the outlet opening.

13. Device according to claim 11, with means for separating the decorative layer in an edge region of an outlet opening, wherein the means for separating the decorative layer is arranged along a border of the cover.

14. Device according to claim 13, wherein the means for separating the decorative layer is formed as one or more cutting blades arranged along a border of the cover.

15. Device according to claim 13, wherein the means for separating the decorative layer is configured so that a part of the decorative layer cut out when the airbag is triggered remains fixed to the means for separating the decorative layer and is moved at least partially out of the passenger space of the vehicle together with the motion of the opened cover.

16. Device according to claim 11, for which the decorative layer is formed as one of a decorative film applied to a foam layer, a leather layer made from natural or synthetic leather and a textile material.

17. Device according to claim 1, with a connection for a gas line of a gas generator.

18. Airbag module, containing a device according to claim 1, with a frame part for holding the device and with fastening means for the installation of the airbag module into an instrument panel, wherein the fastening means is preferably arranged on the frame part.

19. Airbag module according to claim 18 in combination with an instrument panel.

20. Method for producing an instrument panel module with a device according to claim 1 comprising the following steps:

producing the airbag device, positioning of the cover of the airbag device in the outlet opening for the airbag in the instrument panel module, so that the airbag flap and, if necessary, the frame, end flush with the surface of the instrument panel module, and applying of a decorative layer with an essentially constant thickness on a plane formed by the airbag flap and the surface of the instrument panel module.

21. Method according to claim 20, wherein the decorative layer can be a decorative film on a foam layer or a leather layer made from natural or synthetic leather or a textile material.

* * * * *